United States Patent [19]

Stallard III

[11] Patent Number: 5,580,104
[45] Date of Patent: Dec. 3, 1996

[54] HIGH CAPACITY BULKHEAD STUFFING INSERT

[75] Inventor: Clinton W. Stallard, III, Hampton, Va.

[73] Assignee: Newport News Shipbuilding & Dry Dock Company, Newport News, Va.

[21] Appl. No.: 434,057

[22] Filed: May 3, 1995

[51] Int. Cl.⁶ .................................................. F16L 39/00
[52] U.S. Cl. ........................ 285/137.1; 285/158; 285/192; 285/286
[58] Field of Search ................................. 285/137.1, 131, 285/150, 286, 189, 192, 158; 138/111, 115, 116, 117, DIG. 11; 174/95, 97

[56] References Cited

U.S. PATENT DOCUMENTS

| | | | |
|---|---|---|---|
| 771,594 | 10/1904 | Wilhelmi | 138/111 X |
| 3,934,787 | 1/1976 | Fels | 285/189 |
| 4,089,549 | 5/1978 | Vyse et al. | 285/137.1 |
| 4,819,971 | 4/1989 | Stallard | 285/131 |

FOREIGN PATENT DOCUMENTS 3003066  7/1981  Germany ........................... 285/137.1

*Primary Examiner*—Dave W. Arola
*Attorney, Agent, or Firm*—Lalos & Keegan

[57] ABSTRACT

A single insert is provided with a plurality of curved channels extending therethrough. Such insert allows passage of a relatively large number of cables through a relatively small area of a pressure vessel wall, and the curvature of the channels prevents a straight line path for gamma radiation. The curvature of the channels (i.e. their radius) exceeds the design minimum bend radius for cables that will be passed through the insert. The ends of the insert are conical in shape to provide increased spacing for gland nuts secured in the ends of the channels.

7 Claims, 2 Drawing Sheets

HIGH CAPACITY BULKHEAD STUFFING INSERT

BACKGROUND OF THE INVENTION

The present invention is related to fittings or inserts that are used to pass pipes, cables, wires, etc. through a shell or wall that forms a pressure boundary, e.g. the bulkhead or shell of a vessel. In certain prior art fittings, called stuffing tubes, a single tube is provided for each wire or cable that is to be passed through the bulkhead.

To prevent the structural integrity of the bulkhead from being compromised, the stuffing tubes must be sufficiently spaced. This limits the number of tubes that may be installed in a given bulkhead or area of a bulkhead. In existing vessels, especially submarines, the area available for the installation of stuffing tubes is limited and fully occupied with existing stuffing tubes. Adding new circuits with wires or cables that must pass through these areas is difficult, if not impossible.

A solution proposed in the prior art is a single penetration fitting that allows a relatively large number of pipes or cables to be brought across a relatively small area. This solution is disclosed in U.S. Pat. No. 4,819,971, issued to the inventor of the present application and assigned to the same assignee as the present application. In the U.S. Pat. No. '971 fitting, a number of straight channels are drilled through a single penetrator, each channel permitting passage of a pipe or cable. In one embodiment, transverse channels are drilled into the ends of the penetrator and meet the straight channels at a right angle. This, in effect, increases the end surface area over which pipes can be fitted onto the penetrator.

The straight channels of the U.S. Pat. No. '971 fitting, while suitable for many applications, present certain disadvantages when the U.S. Pat. No. '971 fitting (or the prior art stuffing tube) is used in certain applications. For example, when the U.S. Pat. No. '971 fitting or a stuffing tube is installed in a reactor bulkhead, the cross-sectional area of the channel or tube provides an unshielded path for gamma radiation. Special shielding techniques must be employed to compensate for these radiation paths. Also, when cables are to be passed across a pressure boundary, the right angle bend (in the U.S. Pat. No. '971 channels with side ports) is too extreme and fails to meet the design minimum bend radius for most cables.

SUMMARY OF THE INVENTION

The present invention overcomes the disadvantages of the prior art by providing a single insert with a plurality of curved channels extending therethrough. Such insert allows passage of a relatively large number of cables through a relatively small area of the pressure vessel wall, and the curvature of the channels prevents a straight line path for gamma radiation.

The curvature of the channels (i.e. their radius) exceeds the design minimum bend radius for cables that will be passed through the insert. The ends of the insert are conical in shape to provide increased spacing for gland nuts secured in the ends of the channels.

DETAILED DESCRIPTION

Figure 1:
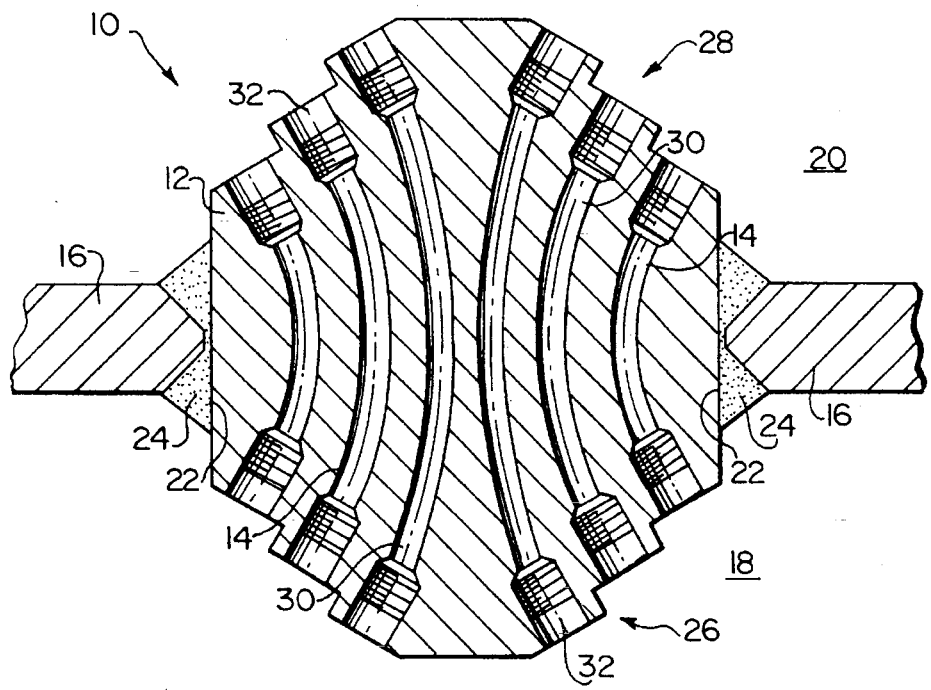
FIG. 1 is a cross-sectional view of the insert of the present invention extending through and welded to a shell or wall forming a pressure boundary.

The stuffing insert 10 of the present invention is shown in FIG. 1. Insert 10 includes a generally cylindrical body 12 that is substantially solid except for channels 14. Body 12 may be made of any material (e.g. carbon steel), but preferably one that is weld compatible with the material of wall or shell 16. Wall 16 will typically be metal plating of sufficient thickness to separate a high pressure medium 18, e.g. water under pressure, from a lower pressure medium 20, e.g. the atmosphere.

Insert 10 is received in aperture 22, which is normally cut or drilled in wall 16. Insert 10 is connected to wall 16 in any suitable manner, but preferably is welded in place using filler material 24 and a welding procedure appropriate for the specific wall 16 and insert 10.

As shown in FIG. 1, each of channels 14 is preferably, although not necessarily, curved along its entire length from insert 10 high pressure end 26 to insert 10 low pressure end 28. Channels 14 are preferably formed, in section, as radially separated arc lengths of two sets of concentric circles with their centers on plane P. Each of channels 14 is preferably formed with a cable passageway 30 of a given diameter terminating on high and low pressure ends 26 and 28, respectively, in larger diameter gland bores 32. Ends 26 and 28 are stepped conical in shape to provide a greater surface area for locating bores 32, as will be discussed in greater detail hereinafter.

Figure 2:
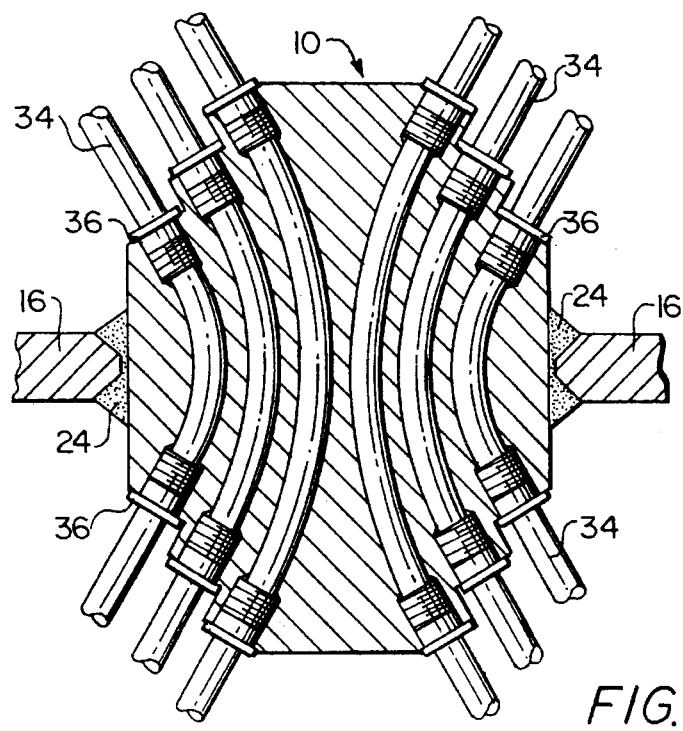
FIG. 2 is a cross-sectional view showing cables passing through and connected to the insert of the present invention.

The present invention is especially suited for carrying cables 34 (FIG. 2) across a pressure boundary. Such cables will preferably be secured to and sealed within insert 10 on each end with packing, a lock washer, and a gland nut 36 (FIG. 2), which when tightened presses the lockwasher against the packing thereby compressing it to provide a fluid seal. Such securing and sealing arrangement is well known in the art. Only the gland nut 36 is shown in FIG. 2 for illustrative purposes. Gland bores 32 are appropriately sized to accommodate the packing and lock washers and are machined to cooperate with gland nuts 36.

The present invention permits the density of cables passing across a pressure boundary to be increased over the prior art arrangements. This advantage permits passage of more cables through a given bulkhead area or, a lesser bulkhead area required for passage of the same number of cables. This advantage is achieved by the channels 14 being curved. As will be described, this feature gives rise to a greater area available on insert ends 26 and 28 for the location of gland bores 32.

The primary factor limiting packing density is the gland bore 32, which is larger in diameter than its associated cable passageway 30. Bores 32 must be separated by a given distance, in part, to accommodate the size of the gland nuts 36. Curvature of the cable passageways 30 permits out-of-plane location of the gland bores 32 on ends 26 and 28 of insert 10. As will be appreciated, locating the gland bores 32 on a plane that is at an angle to horizontal increases the available area over that provided on the horizontal plane. One criterion is that the centerline of the gland bore be normal to the plane on which it is located.

Figure 3:
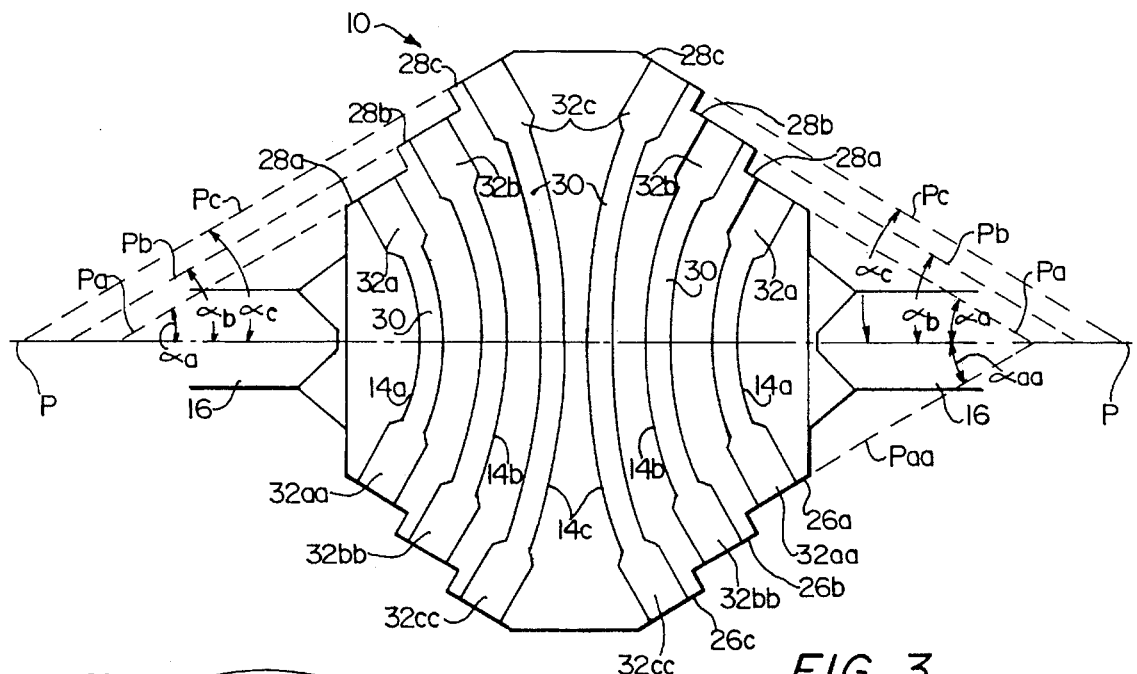
FIG. 3 is a side view showing the angles formed by the stepped conical ends of the insert of the present invention.

For example, with reference to FIG. 3, wall 16 is located on horizontal plane P. Gland bores $32_a$ are located on planes $P_a$ that are at an angle $\alpha_a$ to plane P. Gland bores $32_b$ are located on planes $P_b$ that are at angle $\alpha_b$ to plane P. Preferably, planes $P_a$ and $P_b$ are parallel with $\alpha_b = \alpha_a$. Additional gland bores $32_c$ can be fit by locating them on planes $P_c$ that are at an angle $\alpha_c$ to plane P, preferably with $\alpha_c = \alpha_b = \alpha_a$. Locating bores $32_a$, $32_b$ and $32_c$ out of plane P provides sufficient area to adequately space such bores from each other. With the minimum spacing requirements between bores being met by out-of-plane locations, the packing density is now limited only by the diameters of passageways 30 which are much smaller than those of gland bores 32.

Figure 4:
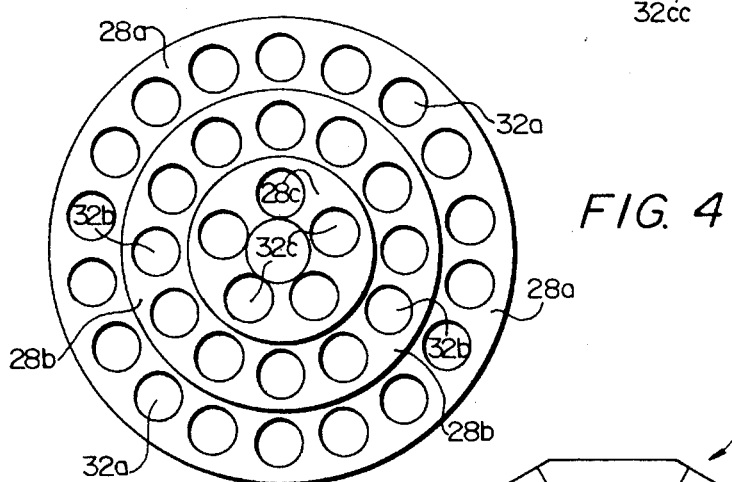
FIG. 4 is a top view of the insert of the present invention.

With reference to FIGS. 3 and 4, it can be seen that channels $14_a$ form a first set of eighteen channels that terminate in gland bores $32_a$ on surface $28_a$ of insert low pressure end 28 and in gland bores $32_{aa}$ on surface $26_a$ of insert high pressure end 26. Similarly channels $14_b$ form a second set of twelve channels and channels $14_c$ form a third set of five channels. The number of channels and number of sets will of course be dependent on each particular application of the present invention. With reference to FIG. 3, gland bores $32_{aa}$ are located on plane $P_{aa}$ that is at an angle $\alpha_{aa}$ to plane P. Typically, although not necessarily, $\alpha_{aa}$ is substantially equal to $\alpha_a$.

Figure 5:
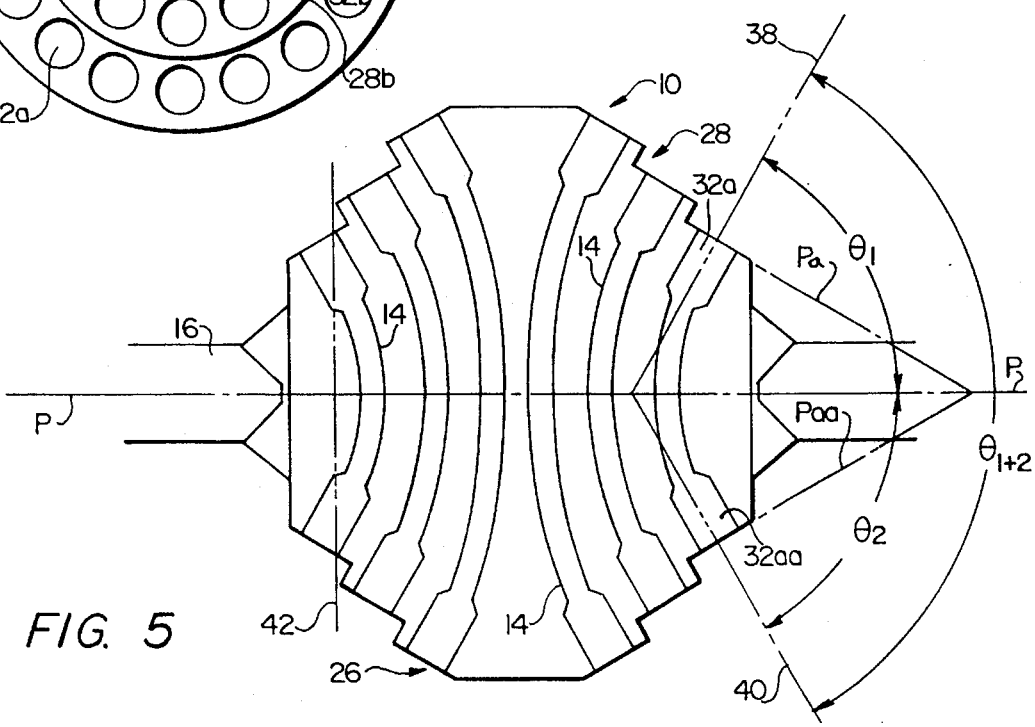
FIG. 5 is a side view showing angles representing the degree of curvature of the channels formed in the insert of the present invention.

The minimum radius of each channel 14 is a function of the design minimum bend radius of the cable 34 that must pass through insert 10. Preferably, the radius of a channel will be at least 1.3 times the design minimum bend radius of the cable 34 intended for that channel. For cables that will typically be utilized with the present invention, the curvature of channels 14 can be defined in terms of the angles of inclination of the channels with respect to the wall 16 or plane P in which the wall lies. With reference to FIG. 5, the centerline of each gland bore 32 is normal to the plane on which it is located. For example, centerline 38 of gland bore $32_a$ is normal to plane $P_a$ and centerline 40 of gland bore $32_{aa}$ is normal to plane $P_{aa}$.

Centerline 38 is inclined at an angle $\theta_1$ to plane P and centerline 40 is inclined at angle $\theta_2$ to plane P. The sum $\theta_{1+2}$ of $\theta_1$ and $\theta_2$ defines, for each channel 14, the degree of curvature for that channel. In the present invention, this angle $\theta_{1+2}$ will be in the range of 50 to 140 degrees to accommodate the design minimum bend radius for all cables, but will preferably be in the range of 90 to 120 degrees to accommodate typical cables that would be used in the environment for which the present invention is intended. For small diameter cabling, angle $\theta_{1+2}$ will preferably be in the range of 50 to 90 degrees. For large diameter cabling, angle $\theta_{1+2}$ will preferably be in the range of 100 to 140 degrees.

Insert 10 will preferably be cast, e.g. by investment casting, with curved channels 14 cast into body 12. As described above, channels 14 are arranged radially and extend from one conical or stepped conical end 28 to the other similarly formed end 26. The gland bores 32 will preferably be machined and threaded as a socket to accept a standard compression gland. Preferably, the minimum diameter of channel 14 will be the diameter of the cable plus ⅛ inch for unarmored cable, and the diameter of the cable plus ⅜ inch for armored cable.

An additional advantage of the present invention is that it ensures against radiation passing through insert 10 by providing at least minimal shielding. In environments where the present invention is used to pass cables or the like through walls of pressure vessels or containment structures enclosing a source of radiation, insert 10 is made of a radiation shielding material, such as commercial grade carbon steel. Insert 10 is designed with curved channels 14 such that any straight line (e.g. line 42 in FIG. 5) passing through insert 10 from one end (e.g. high pressure end 26) to the other end (e.g. low pressure end 28) must pass through at least two lineal inches of the radiation shielding material. Thus, there is no straight unobstructed passage through the body of the insert, as contrasted to the straight stuffing tubes of the prior art or straight passages of the U.S. Pat. No. '971 fitting described previously herein. From the foregoing detailed description, it will be evident that there are a number of changes, adaptations and modifications of the present invention that will occur to those having ordinary skill in the art to which the invention pertains. However, it is intended that all such variations not departing from the spirit of the invention be considered within the scope thereof as limited solely by the appended claims, wherein I claim:

1. Apparatus for providing a plurality of channels across a pressure boundary, comprising:

a wall forming said pressure boundary, said wall including an aperture through a plane of said wall;

an insert received within said aperture and mounted to said wall, said insert having a low pressure end located on a low pressure side of said pressure boundary and a high pressure end located on a high pressure side of said pressure boundary;

said insert including a plurality of curved channels passing through the length of said insert from said low pressure end to said high pressure end, said insert being substantially solid except for said curved channels;

a set of said channels terminating at a first surface of the low pressure end of said insert, said first surface being formed at a first angle to said plane of said wall;

said set of channels terminating at a first surface of the high pressure end of said insert, said high pressure end first surface being formed at a second angle to said plane of said wall; and wherein said set of channels terminates in a first set of enlarged bores on said low pressure end first surface, and each of said first set of enlarged bores includes a centerline that is normal to said low pressure end first surface, each said centerline of said first set of enlarged bores being oblique and inclined at a third angle to said plane of said wall; and said set of channels terminates in a second set of enlarged bores on said high pressure end first surface, and each of said second set of enlarged bores includes a centerline that is normal to said high pressure end first surface, each said centerline of said second set of enlarged bores being oblique and inclined at a fourth angle to said plane of said wall.

2. Apparatus as in claim 1 wherein the sum of said third and fourth angles is in the range of 50 to 140 degrees.

3. Apparatus as in claim 2 wherein the sum of said third and fourth angles is in the range of 90 to 120 degrees.

4. Apparatus as in claim 2 wherein the sum of said third and fourth angles is in the range of 50 to 90 degrees.

5. Apparatus as in claim 2 wherein the sum of said third and fourth angles is in the range of 100 to 140 degrees.

6. Apparatus as in claim 1 wherein said insert is made of a gamma radiation shielding material; and wherein each of said channels is curved to the degree that any straight line through said insert from said high pressure end to said low pressure end passes through at least two lineal inches of said gamma radiation shielding material.

7. Apparatus for providing a plurality of channels across a pressure boundary, comprising:

a wall forming said pressure boundary, said wall including an aperture through a plane of said wall;

an insert received within said aperture and mounted to said wall, said insert having a low pressure end located on a low pressure side of said pressure boundary and a high pressure end located on a high pressure side of said pressure boundary;

said insert including a plurality of curved channels passing through the length of said insert from said low pressure end to said high pressure end, said insert being substantially solid except for said curved channels; and wherein said insert is made of a gamma radiation shielding material; and each of said channels is curved to the degree that any straight line through said insert from said high pressure end to said low pressure end passes through at least two lineal inches of said gamma radiation shielding material.

* * * * *